(12) United States Patent
McKee et al.

(10) Patent No.: US 12,207,659 B2
(45) Date of Patent: Jan. 28, 2025

(54) MULTIZONE OVEN WITH IMPROVED CLEANING DISTRIBUTION

(71) Applicant: Alto-Shaam, Inc., Menomonee Falls, WI (US)

(72) Inventors: Philip McKee, Frisco, TX (US); Joshua Shimel, Waukesha, WI (US); Andrew Podevels, Wauwatosa, WI (US); Lee VanLanen, McKinney, TX (US); Jeff Maddox, Garland, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 902 days.

(21) Appl. No.: 17/078,711

(22) Filed: Oct. 23, 2020

(65) Prior Publication Data

US 2021/0120825 A1 Apr. 29, 2021

Related U.S. Application Data

(60) Provisional application No. 62/962,313, filed on Jan. 17, 2020, provisional application No. 62/924,924, filed on Oct. 23, 2019.

(51) Int. Cl.
| | |
|---|---|
| *F24C 15/32* | (2006.01) |
| *A21B 1/40* | (2006.01) |
| *A21B 3/00* | (2006.01) |
| *A21B 3/04* | (2006.01) |
| *A47J 27/05* | (2006.01) |

(Continued)

(52) U.S. Cl.
CPC .............. *A21B 3/006* (2013.01); *A21B 1/40* (2013.01); *A21B 3/04* (2013.01); *A47J 27/05* (2013.01); *A47J 36/32* (2013.01); *A47J 36/42* (2013.01); *F24C 14/005* (2013.01); *F24C 15/16* (2013.01);

(Continued)

(58) Field of Classification Search
None
See application file for complete search history.

(56) References Cited

U.S. PATENT DOCUMENTS 5,368,008 A * 11/1994 Oslin ...................... A21B 3/04
126/369
5,619,983 A * 4/1997 Smith ................... F24C 15/327
126/369

(Continued)

FOREIGN PATENT DOCUMENTS

DE        10028895 A1 * 12/2001 ............. F26B 5/044
JP        2017080646         5/2017

(Continued)

OTHER PUBLICATIONS

Translation of DE10028895 (Year: 2024).*

*Primary Examiner* — Edelmira Bosques
*Assistant Examiner* — Deepak A Deean
(74) *Attorney, Agent, or Firm* — Wong Meyer Smith & McConnell

(57) ABSTRACT

A multi cavity oven provides improved cavity and jet plate cleaning by directing pressurized cleaning spray into the jet plates while installed within the oven through cleaning spray inlet ports in the walls of the removable jet plates. By directing cleaning spray directly into the interior of the jet plates, cooking juices that fall through the slots and openings and into the air passageway of the jet plates can be pressure cleaned and drained from the interior of the jet plates without removing the jet plates from the oven cavity.

18 Claims, 10 Drawing Sheets

(51) Int. Cl.
*A47J 36/32* (2006.01)
*A47J 36/42* (2006.01)
*F24C 14/00* (2006.01)
*F24C 15/16* (2006.01)
*A47J 27/04* (2006.01)

(52) U.S. Cl.
CPC ....... *F24C 15/327* (2013.01); *A47J 2027/043* (2013.01)

(56) References Cited

U.S. PATENT DOCUMENTS

| | | | |
|---|---|---|---|
| 10,986,843 B2* | 4/2021 | McKee | F24C 15/322 |
| 2007/0193295 A1* | 8/2007 | Hansen | F25D 21/14 |
| | | | 62/440 |
| 2008/0223357 A1* | 9/2008 | Bartelick | F24C 14/005 |
| | | | 126/21 A |
| 2016/0356506 A1* | 12/2016 | McKee | F24C 15/18 |
| 2017/0211819 A1* | 7/2017 | McKee | F24C 15/166 |
| 2018/0224129 A1* | 8/2018 | Cukjati | B08B 3/08 |
| 2019/0056118 A1 | 2/2019 | McKee et al. | |
| 2019/0239517 A1* | 8/2019 | McKee | F24C 15/322 |
| 2019/0239518 A1* | 8/2019 | McKee | A21B 3/04 |
| 2019/0242586 A1 | 8/2019 | McKee et al. | |
| 2019/0242587 A1* | 8/2019 | McKee | F24C 14/005 |

FOREIGN PATENT DOCUMENTS

| | | |
|---|---|---|
| KR | 10-2015-0011079 | 1/2015 |
| KR | 10-1628919 | 6/2016 |

* cited by examiner

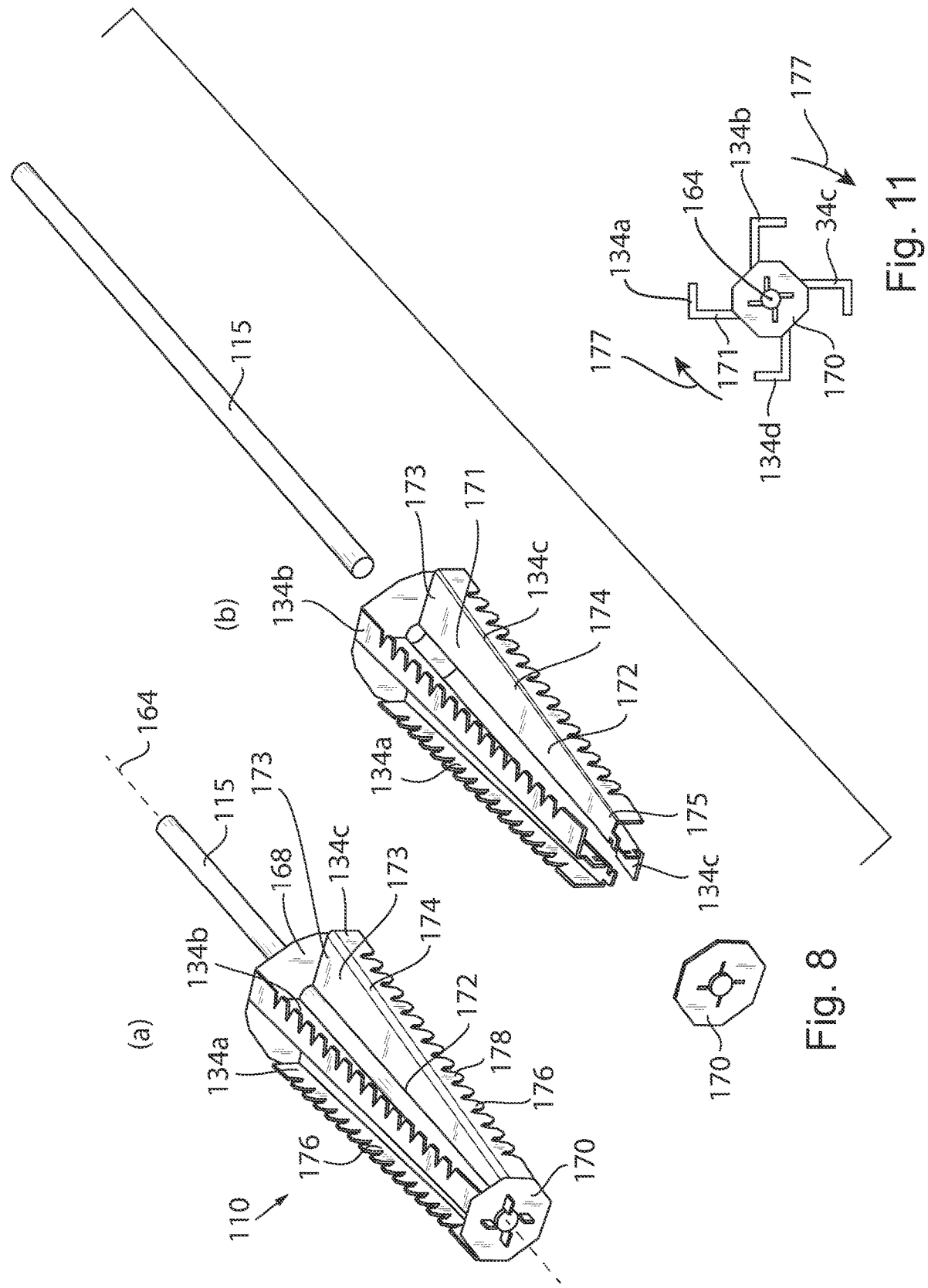

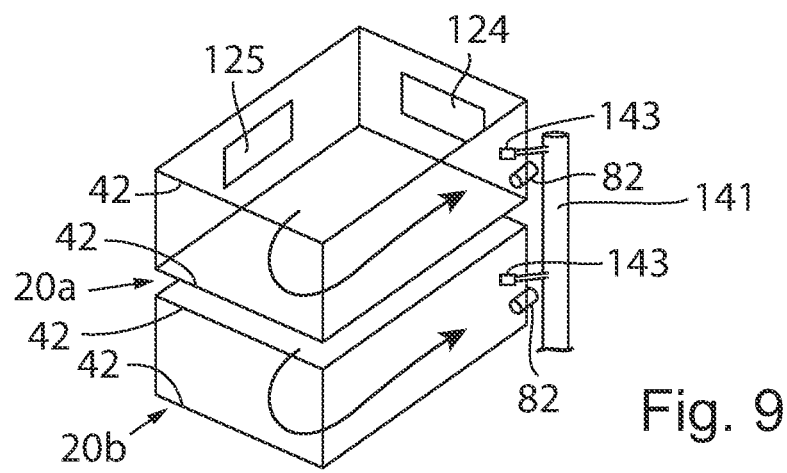
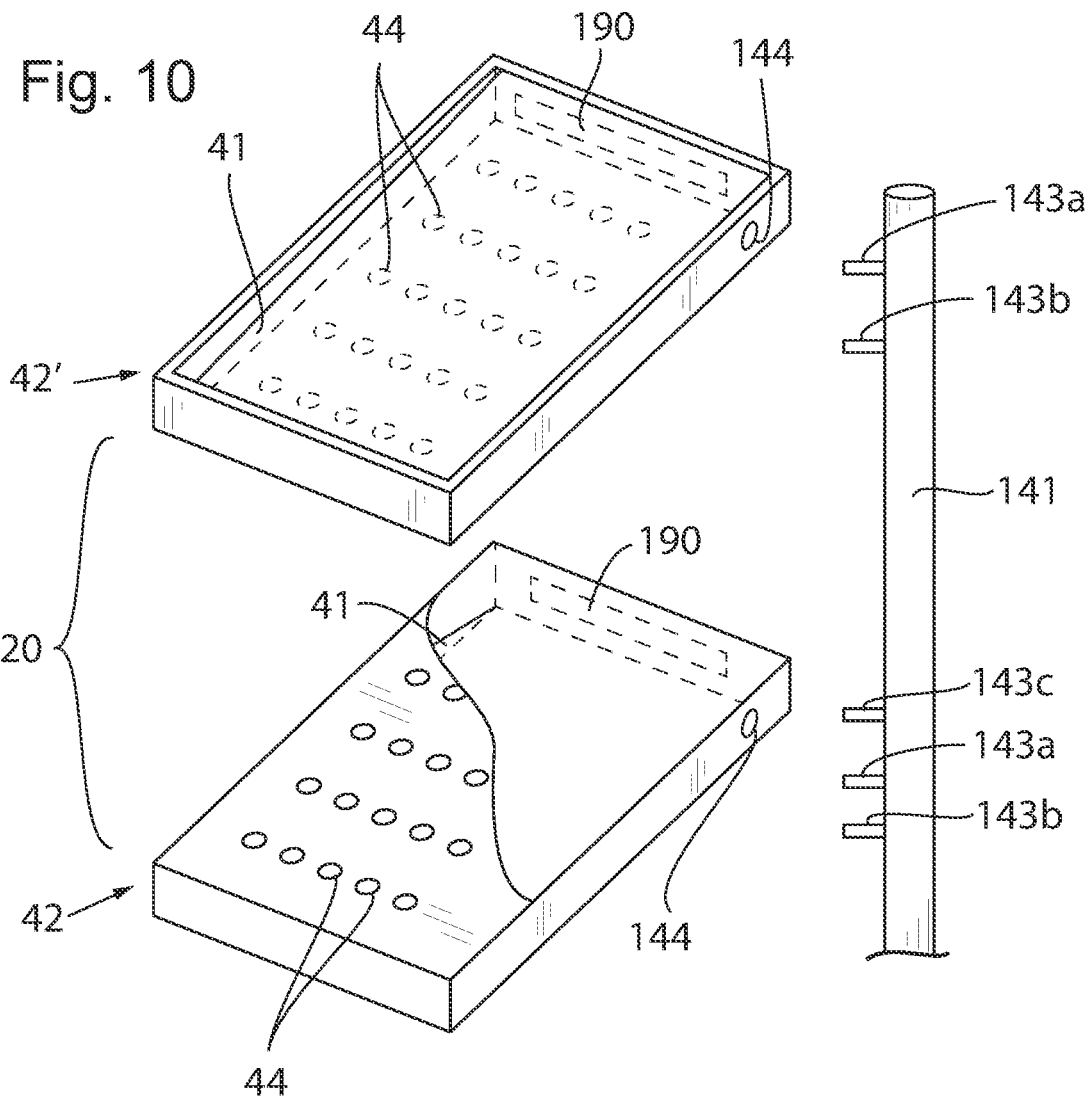

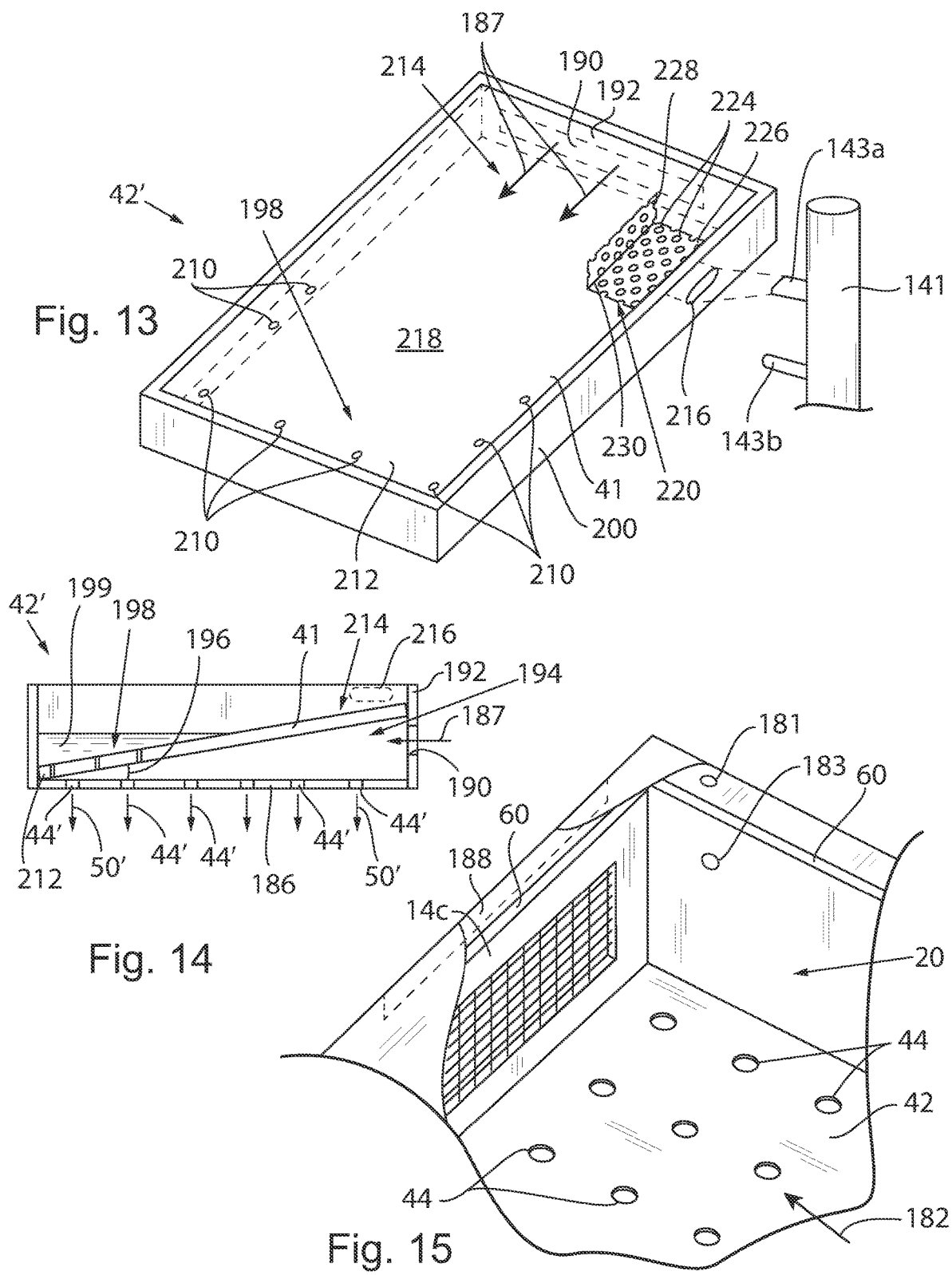

| | | | CLEANING SCHEDULE | | | | | |
|---|---|---|---|---|---|---|---|---|
| Step | Time | Temperature | Blower | Pump | Water valve | Steam Generation | Notes | |
| 1 | NA | 180F | 70% | Off | Off | Off | Warm-up | ⎫ |
| 2 | 0:15:00 | 180F | 50% | Off | Off | On | Steam | ⎬ 300 |
| 3 | 0:00:30 | 180F | 30%-idle | On | Off | Off | | |
| 4 | 0:00:05 | 180F | 30%-idle | Off | On | Off | | ⎭ |
| 5 | 0:30:00 | 180F | 70% | On | Off | Off | Cleaning 1 | ⎫ |
| 6 | 0:03:00 | 180F | 50% | Off | Off | On | top off/Steam | |
| 7 | 0:30:00 | 180F | 100% | On | Off | Off | Cleaning 2 | |
| 8 | 0:03:00 | 180F | 50% | Off | Off | On | top off/Steam | |
| 9 | 0:30:00 | 180F | 90% | On | Off | Off | Cleaning 3 | |
| 10 | 0:03:00 | 180F | 50% | Off | Off | On | top off/Steam | ⎬ 302 |
| 11 | 0:30:00 | 180F | 80% | On | Off | Off | Cleaning 4 | |
| 12 | 0:03:00 | 180F | 50% | Off | Off | On | top off/Steam | |
| 13 | 0:30:00 | 170F | 70% | On | Off | Off | Cleaning 5 | |
| 14 | 0:03:00 | 170F | 50% | Off | Off | On | top off/Steam | |
| 15 | 0:30:00 | 160F | 60% | On | Off | Off | Cleaning 6 | ⎭ |
| 16 | 0:01:00 | Off | Off | On | Off | Off | Settle | ⎫ |
| 17 | 0:04:00 | Off | Off | Off | Off | Off | Settle | |
| 18 | 0:00:30 | Off | Off | Off | On | Off | Flush | |
| 19 | 0:10:00 | 140F | 100% | On | Off | Off | Rinse 1 | |
| 20 | 0:01:00 | Off | Off | On | Off | Off | Settle | |
| 21 | 0:04:00 | Off | Off | Off | Off | Off | Settle | |
| 22 | 0:00:30 | Off | Off | Off | On | Off | Flush | |
| 23 | 0:05:00 | 140F | 100% | On | Off | Off | Rinse 2 | |
| 24 | 0:01:00 | Off | Off | On | Off | Off | Settle | |
| 25 | 0:04:00 | Off | Off | Off | Off | Off | Settle | |
| 26 | 0:00:30 | Off | Off | Off | On | Off | Flush | |
| 27 | 0:05:00 | 140F | 100% | On | Off | Off | Rinse 3 | ⎬ 308 |
| 28 | 0:01:00 | Off | Off | On | Off | Off | Settle | |
| 29 | 0:04:00 | Off | Off | Off | Off | Off | Settle | |
| 30 | 0:00:30 | Off | Off | Off | On | Off | Flush | |
| 31 | 0:05:00 | 140F | 100% | On | Off | Off | Rinse 4 | |
| 32 | 0:01:00 | Off | Off | On | Off | Off | Settle | |
| 33 | 0:04:00 | Off | Off | Off | Off | Off | Settle | |
| 34 | 0:00:30 | Off | Off | Off | On | Off | Flush | |
| 35 | 0:02:00 | 140F | 100% | On | Off | Off | Rinse 5 | ⎭ |
| 36 | 0:00:30 | 140F | 30%-idle | Off | On | Off | Fill | ⎫ |
| 37 | 0:10:00 | 140F | 100% | On | Off | Off | Descale | |
| 38 | 0:04:00 | Off | Off | Off | Off | Off | Settle/Drain | ⎬ 316 |
| 39 | 0:00:30 | Off | Off | Off | On | Off | Fill | |
| 40 | 0:05:00 | 140F | 100% | On | Off | Off | Rinse 1 | ⎭ |

Fig. 18

MULTIZONE OVEN WITH IMPROVED CLEANING DISTRIBUTION

CROSS REFERENCE TO RELATED APPLICATION

This application claims the benefit of U.S. Provisional Application No. 62/924,924, filed Oct. 23, 2019, and U.S. Provisional Application No. 62/962,313, filed Jan. 17, 2020, both of which are hereby incorporated by reference.

STATEMENT REGARDING FEDERALLY SPONSORED RESEARCH OR DEVELOPMENT

N/A

BACKGROUND OF THE INVENTION

The present invention relates to ovens for the preparation of food, and in particular, to a multizone oven providing separately controlled convection heating and spray cleaning within each cooking zone.

Combination steam and convection ovens ("combi-ovens") cook using combinations of convection and steam. In convection cooking, heated air is circulated rapidly through the cooking compartment to break up insulating, stagnant layers of air around the food, thereby increasing the rate of heat transfer. Higher velocity air typically increases the rate of heat transfer from the air to the food by further disrupting the insulating, stagnant layers of air around the food, as does striking the largest surface of the food with air delivered in a generally perpendicular direction to the food, since perpendicular air is more disruptive to such insulating, stagnant layers of air than air gliding across the largest surface of the food. High humidity further enhances the rate of heat transfer to the food as a result of the high specific heat of water compared to dry air, and such humidity may be used at temperatures approximating the boiling point of water (often called "steam-cooking") or in a superheated state well above the boiling temperature of water (often called "combi-cooking"). Steam can also reduce water loss from the food. Combi-ovens are described, for example, in U.S. Pat. Nos. 7,307,244 and 6,188,045 assigned to the assignee of the present invention and hereby incorporated by reference.

In a common, combi-oven design, steam is generated by spraying water on the fan used for convection air or on structure associated with that fan. This mechanical atomization process breaks up the water into a fine spray that facilitates the generation of steam when the water strikes an adjacent heating coil.

Professional kitchens are often called upon to simultaneously prepare a wide variety of dishes, each one optimally being cooked for different periods of time at different cooking temperatures, optimally according to a schedule that enables multiple different dishes to emerge from the oven at the same time for the purpose of coordinating simultaneous delivery of a variety of "fresh out of the oven" food items to different customers at the same table. U.S. Pat. No. 9,677,774, also assigned to the assignee of the present invention and hereby incorporated by reference, describes a multi-zone convection oven that can provide independent control of temperature, blower speed, steam generation and cook time for each cooking zone for this purpose.

SUMMARY OF THE INVENTION

The present invention further improves over the prior art by providing improved cavity and jet plate cleaning by directing pressurized cleaning spray into the jet plates while installed within the oven through cleaning spray inlet ports in the walls of the removable jet plates. By directing cleaning spray directly into the interior of the jet plates, cooking juices that fall through the slots and openings and into the air passageway of the jet plates can be pressure cleaned and drained from the interior of the jet plates without removing the jet plates from the oven cavity.

The present invention provides improved spray cleaning, particularly for multizone ovens with separate cooking cavities, by directing pressurized cleaning spray above a baffle wall of upper jet plates. The present invention further improves over the prior art by providing an improved suds production on the upper surface of the baffle wall of upper jet plates by providing small air holes in the baffle wall of the upper jet plate. By providing small air holes, an increased amount of airflow is provided upward to the pool of cleaning fluid when the blower is on to produce more trapped air in the form of soap bubbles. The small air holes also allow suds to drain into the interior of the upper jet plates when the blower is off or low to better clean the inner plenum.

The present invention further improves over the prior art by providing a spray diverter at the upper surface of the upper jet plates, directly in front of the spray outlet, to provide more effective distribution of cleaning solution to the upper surface of the upper jet plates which is also sloped downward to provide buildup of water and suds which can then drop downward through the small air holes into the interior of the jet plates.

The present invention further improves over the prior art by providing small holes in the top wall of the upper jet plates, directly in front of the spray outlet, to allow for the atomization of water from the cleaning jet spray into the interior of the jet plates (when the jet spray is directed into an upper surface of the top wall of the upper jet plates) by low pressure venturi drawing water through the holes to clean the interior of the jet plates.

The present invention provides improved control of steam generation, particularly for small oven cavities, by providing distinct and independent mechanical atomization and convection blower speed control through the use of separate motors and independent control chains. By providing a separate mechanical atomizer, consistent steam generation volumes and delivery times can be obtained which are independent of the main convection blower speed.

The present invention further improves over the prior art by providing an improved steam generator through the use of an atomizer dispensing a stream of water or water droplets onto a rotating spinner creating improved circumferential distribution of a fine water spray onto an adjacent heating coil with low energy input.

The present invention further improves over the prior art by providing an improved sealing between the multiple cavities when the oven door is closed by providing an improved front gasket between cavities that when pressed against the inner surface of the glass panel prevents residue buildup against the glass panel and provides multiple distinct longitudinal seals reducing the risk of sealing failure.

The present invention further improves over the prior art by providing improved uniformity between cooking chambers by using separate drain tubes for each cooking chamber eliminating differences when a lowermost chamber includes a condensation drop-down port submitting to differences with the introduction of steam, the flow of air, and heating etc.

The present invention further provides an improved steam generator using an insulated motor unit spaced away from the cooking cavity and supported by a floating mount accommodating angled shifts of the motor unit to accommodate the fixed spinner shaft.

One embodiment of the present invention provides a multi-cavity oven including a housing having inner walls defining an oven cavity; at least one removable shelf fitting within the oven cavity and providing a horizontally extending passageway through the removable shelf communicating with air jets directed along a vertical direction from at least one horizontal surface of the removable shelf; and at least one fluid spray nozzle extending through an inner wall of the oven cavity and into a wall of the at least one removable shelf to direct a cleaning fluid into the horizontally extending passageway through the at least one removable shelf when the removable shelf is positioned within the oven cavity.

The at least one removeable shelf may provide a fluid inlet port in a vertical wall of the at least one removeable shelf to receive the at least one fluid spray nozzle therein.

The at least one fluid spray nozzle may direct fluid into a vertical side wall of the at least one removable shelf and into an air flow of the horizontally extending passageway.

The oven may include first and second removable shelves and a spray manifold supporting at least two fluid spray nozzles configured to deliver cleaning fluid into the horizontally extending passageways of the first and second removable shelf positioned within the oven cavity.

The oven may include a drain manifold wherein the drain manifold further supports at least two drain tubes configured to receive fluid from the horizontally extending passageways of the at least two removable shelves positioned within the oven cavity.

The drain manifold may recirculate water from the at least two drain tubes to the at least two fluid spray nozzles.

The drain manifold may receive fluid received at a bottom wall of each cooking cavity through a drain port of a vertical wall of the cooking cavity and directs the fluid out of the cooking to a common receptacle of cooling water.

The spray manifold may extend along a rear of a side wall of the oven cavity.

The at least one removable shelf may provide a first removable shelf with a first horizontally extending passageway and a second removable shelf with a second horizontally extending passageway communicating respectively with vertical upward and vertical downward directed air jets.

The at least one fluid spray nozzle may deliver cleaning fluid into both the first and second horizontal passageways of the first and second removeable shelves.

The at least one fluid spray nozzle may extend horizontally into the fluid inlet port of the at least one removable shelf wherein the fluid inlet port may extend over an upper surface of a top wall of the horizontally extending passageway.

The upper surface of the top wall of the horizontally extending passageway may be sloped downward from the fluid inlet port to an opposite end and the opposite end contains drainage holes permitting a flow of air upward and a flow of fluid downward into the horizontally extending passageway.

The oven may include a diverter plate positioned directly in front of the at least one fluid spray nozzle to receive the cleaning fluid from the at least one fluid spray nozzle.

The diverter plate may be perforated.

The diverter plate may have a horizontal plate and a vertical plate, the horizontal plate extending along the top wall and the vertical plate extending perpendicular to the top wall to block a flow of the cleaning fluid from the at least one fluid spray nozzle.

The diverter plate may be attached to the upper surface of the top wall of the at least one removable shelf.

The at least one removeable shelf may provide small holes in the top wall of the horizontally extending passageway positioned directly in front of the at least one fluid spray nozzle to separate the at least one fluid spray nozzle and the drainage holes to promote an atomization of fluid through the small holes by lower pressure venturi.

The oven may include at least one humidity blocking barrier subdividing the oven cavity into cooking cavities having different humidities wherein each cavity provides a separate heater and a thermal sensor; a controller receiving a user command to independently set temperatures of the multiple cooking cavities; and a steam generator in each of the multiple cooking cavities and having a water source and a steam heater controlled by the controller to introduce steam into selective cooking cavities for steam cooking; wherein the heater and the steam heater of the multiple cooking cavities are independently controlled.

The steam generator may include a spinner having a plurality of outwardly extending vanes and a motor controlled by a controller to rotate the spinner about a horizontal axis; a water source controlled by the controller to emit a spray of water onto the spinner; and a steam heater extending around the spinner to vaporize the water to introduce steam into selective cooking cavities of the oven.

The oven may include at least one humidity blocking barrier subdividing the oven cavity into cooking cavities having different humidities wherein each cavity provides a separate heater and a thermal sensor; a steam generator system introducing steam into selective cooking cavities according to an electric signal; a set of fans circulating air independently through the cooking cavities in isolation from the other cooking cavities; a controller receiving a user command to independently set temperature and humidity of different cooking cavities; and an elastomeric seal positioned between the at least one blocking barrier and the at least one door wherein the elastomeric seal presents an upper cantilevered lip curving to flex upwardly along the inner surface of the at least one door when the door is closed to promote a flow of moisture away from an inner surface of the at least one door and a lower concave surface promoting a sealing of the elastomeric seal against the inner surface.

These particular objects and advantages may apply to only some embodiments falling within the claims and thus do not define the scope of the invention.

BRIEF DESCRIPTION OF THE DRAWINGS

FIGS. 8a and 8b are perspective and exploded views of a spinner of the steam generator of FIG. 7 aiding in the centrifugal dispersion of introduced water dropped onto the spinner along an axis of the spinner;

FIG. 9 is a phantom view of two cooking cavities of FIG. 1 showing a manifold for delivering cleaning fluid to the jet plates;

FIG. 10 is a partial phantom view of an upper and lower jet plate receiving cleaning fluid through a cleaning inlet port from a water injector of the manifold of FIG. 9;

FIG. 11 is a top plan view in cross-section of the spinner of FIGS. 8a and 8b;

FIG. 13 is a perspective view of an upper jet plate receiving cleaning fluid through a cleaning inlet port from a water injector of the manifold of FIG. 9 whereby the cleaning fluid is injected into a spray diverter on an upper surface of a baffle wall of the upper jet plate;

FIG. 14 is a side elevation view in cross section of an upper jet plate of FIG. 13, having exaggerated dimensions for clarity, and showing pooling of water on a sloped upper surface of the baffle wall of the upper jet plate;

FIG. 15 is a fragmentary view of a corner of a cooking cavity with the upper jet plate removed and showing the cleaning inlet ports for injection of cleaning fluid from the water injector of the manifold of FIG. 9 into the upper jet plate and below the upper jet plate but above the lower jet plate when installed and the cooking cavity;

FIG. 18 is a table showing an exemplary cleaning schedule of the present invention showing operation of the heater, blower, pump, water valve, and steam generator during the cleaning cycles.

DETAILED DESCRIPTION OF THE PREFERRED EMBODIMENT

Multizone Oven with Fixed Divider Walls

Figure 1:
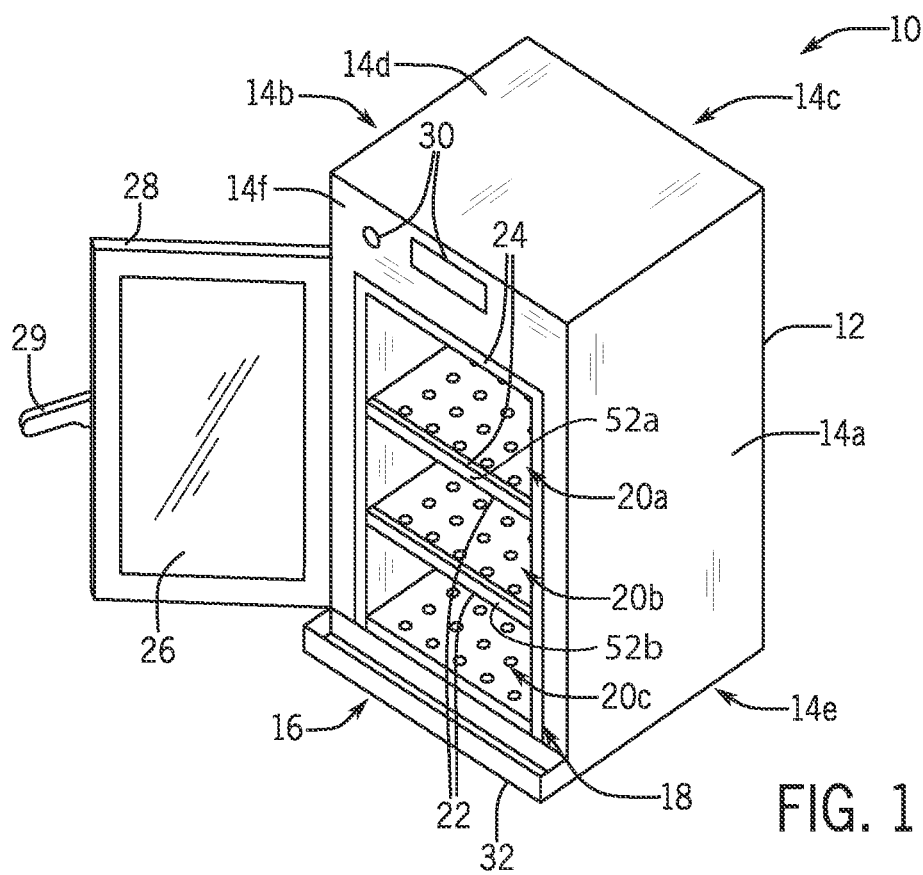
FIG. 1 is a simplified, perspective view of an oven constructed according to one embodiment of the present invention showing a cooking volume divided into cooking cavities by removable shelf assemblies.

Referring now to FIG. 1, a multizone oven 10 may provide for a housing 12 having upstanding right and left outer side walls 14a and 14b and upstanding rear wall 14c extending therebetween. These three walls 14 join generally opposed upper and lower walls 14d and 14e, the latter providing support so that the oven 10 may rest on a cart or the like (not shown).

The walls 14 enclose a generally rectangular cooking volume 16 having an opening 18 through a front wall 14f to provide access to the cooking volume 16 receiving food for cooking. The cooking volume 16 is defined by inner walls 19 spaced inwardly from each of the outer walls 14. The cooking volume 16 may be subdivided into cooking cavities 20a, 20b, and 20c (for example) from top to bottom, by means of divider walls 52 as will be described in more detail below.

The perimeter of the oven opening 18 supports an elastomeric gasket 24 that may seal against an inner surface of a glass panel 26 providing an inner surface of a door 28. The door 28 hinges about a vertical axis at the front edge of wall 14b to move between open and closed states, the latter sealing the cavities 20a-c with respect to the outside air and with respect to each other. The door 28 may be held in the closed state by a latch mechanism and handle 29 as is generally understood in the art. In one embodiment the glass panel 26 of the door 28 extends as a continuous surface over the openings of each of the cavities 20; however, the invention also contemplates separate glass panels or separate doors associated with each of the cavities 20.

An upper portion of the front wall 14f may support user controls 30 including input control such as one or more dials and an output display such as an LCD display for communicating with the user. A condensation tray 32 may extend forward from a lower edge of the front wall 14f to catch condensation from the inner surface of the glass panel 26 when the door 28 is being opened or closed.

A multizone oven of this general design is discussed in US patent publication 2019/0242586 assigned to the assignee of the present invention and hereby incorporated by reference.

Figure 2:
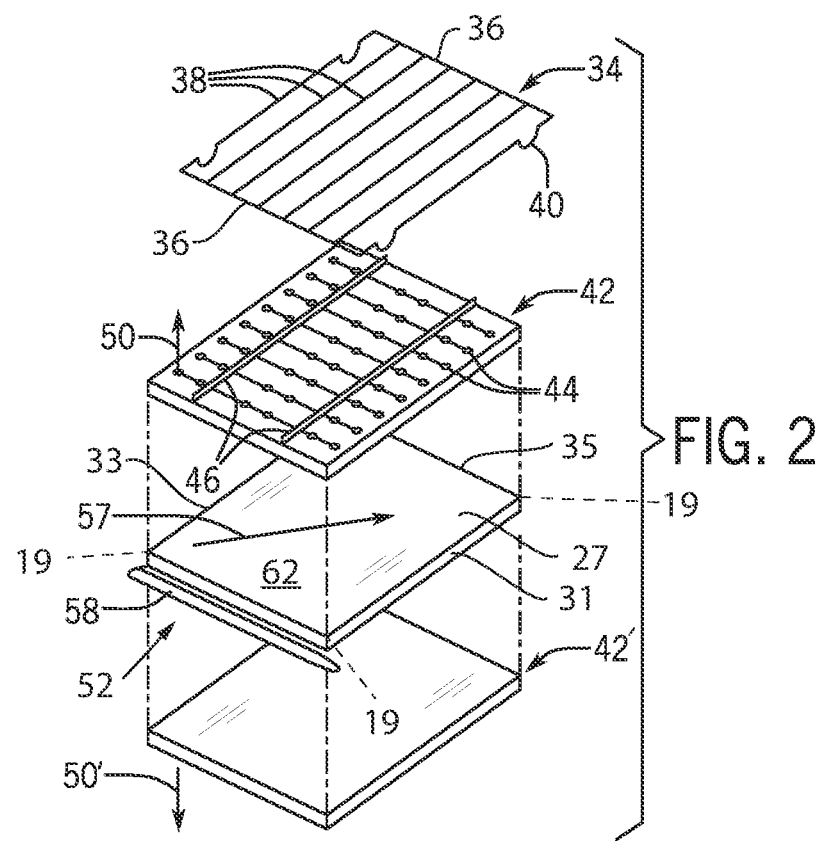
FIG. 2 is an exploded diagram of a removable shelf assembly showing a rack, a lower jet plate (for a higher cavity), and an upper jet plate (for a lower cavity), installed around a divider wall attached to the oven cavity to subdivide the cooking volume into separate cooking cavities.
Figure 3:
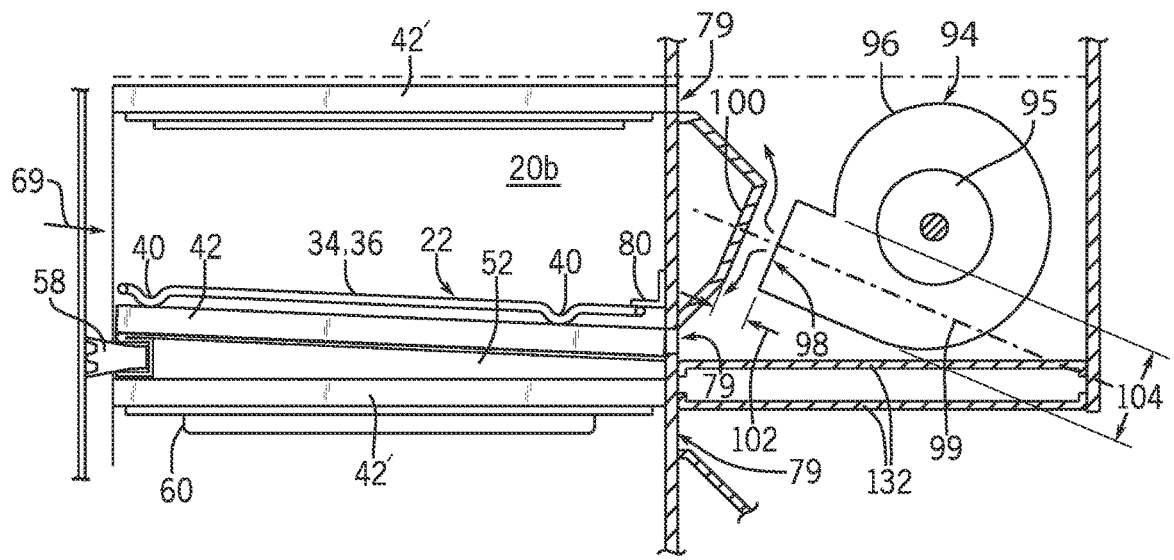
FIG. 3 is a fragmentary, elevational view in cross-section through one cavity of FIG. 1 showing installation of the shelf assembly above and below the divider wall, the rack and lower jet plate compressed against a top of the divider wall.

Referring now also to FIGS. 2 and 3, divider walls 52a, 52b (for example) may be attached to the inner walls 19 of the cooking volume 16 and be vertically spaced to subdivide the cooking volume 16 into cooking cavities 20a, 20b, and 20c. The divider walls 52 may be evenly spaced to provide identically sized cooking cavities 20 or may be unevenly spaced to provide cooking cavities 20 of different sizes. Each divider wall 52 provides a generally rectangular panel 27 sized to extend the full lateral and front to back dimensions of the cooking volume 16 and operating to seal moisture against passage between cooking cavities 20. The right edge 31, left edge 33, and rear edge 35 of the divider wall 52 are attached to the right, left, and rear inner walls 19, respectively, of the cooking volume 16, for example, by welding and sealant or other attachment method which joins the divider wall 52 to the inner walls 19.

A front edge of the divider wall 52 also supports an elastomeric gasket 58 extending forward sealing against the inner surface of the glass panel 26 as will be discussed in greater detail below. The front edge of the divider wall 52 may be tipped from horizontal so that the upper surface slopes rearwardly by an angle 59 and optionally downward from left to right as indicated by drainage arrow 57. The slope promotes water flow to a rear edge and right corner of the divider wall 52.

Installed within the cooking volume 16, above and below the divider walls 52, are shelf assemblies 22 composed of separately removable elements that may be inserted into the cooking volume 16. A wire rack 34 and lower jet plate 42 of the shelf assembly 22 may be installed above the divider walls 52 while an upper jet plate 42' of the shelf assembly 22 is installed below the divider walls 52. An additional upper jet plate 42' may be installed on the top wall of the uppermost cooking cavity 20a and an additional wire rack 34 and lower jet plate 42 may be installed on the floor of the lowermost cooking cavity 20c.

The uppermost component of the shelf assembly 22, the wire rack 34, is removably insertable above the divider wall 52 and having an outer wire element 36 forming a generally rectangular perimeter defining an edge of the shelf assembly 22. The outer wire element 36 supports a set of parallel wire rods 38 between a front and rear edge of the wire element 36 that may support food items while allowing ample airflow therearound. The outer wire element 36 has, in each corner, a downwardly extending foot 40 serving to support the wire rack 34 in spaced elevation above a generally rectangular and planar upper surface of the lower jet plate 42.

The lower jet plate 42, positioned below the wire rack 34 and above the divider wall 52 (or above the floor of lowermost cavity 20c), provides an upper surface perforated by slots and openings 44 and stiffened upwardly extending ribs 46 between a front and rear edge of the lower jet plate 42. A jet plate 42 of this general design is discussed in U.S. Pat. No. 10,337,745 assigned to the assignee of the present invention and hereby incorporated by reference. As discussed in this reference, the lower jet plate 42 provides an internal channel 194 beneath the upper surface of the jet plate 42 conducting air from a rearward opening edge of the jet plate 42 through the jet plate 42 to exit from the slots and openings 44 as a set of structured air jet 50 openings 44.

Figure 4:
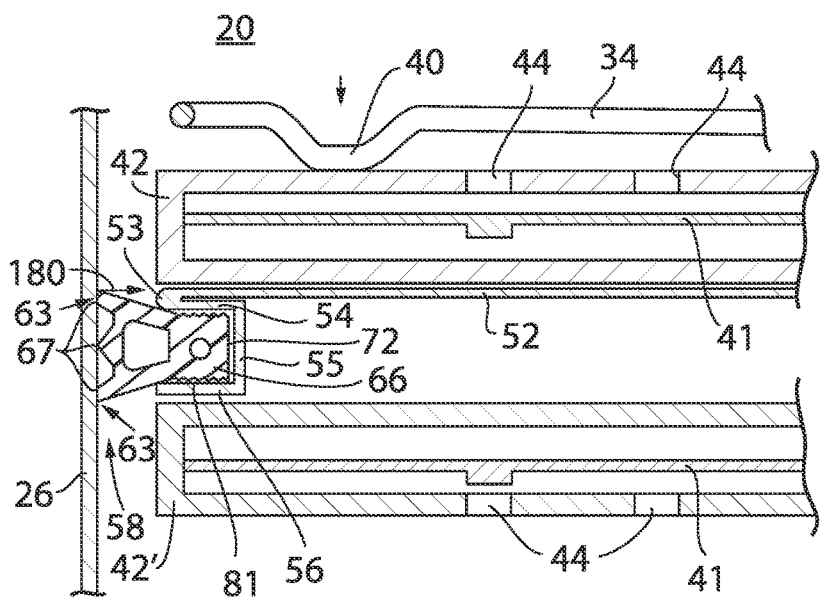
FIG. 4 is a fragmentary, side elevational view in cross-section of a front of the shelf assembly of FIG. 1 showing a forward-facing gasket for compression on the glass panel of the door.

Referring momentarily to FIG. 4, the jet plate 42 may include an internal horizontal baffle 41 changing the cross-sectional area of the jet plate 42 to provide more uniform airflow through the multiple openings 44. Generally, the size of the openings 44 and the cross-section of the channel 194 within the jet plate 42 will change to promote the desired airflow pattern upward onto food supported by the rack 34. The lower surface of the jet plate 42 in the shelf assembly 22 rests on the divider wall 52.

Positioned beneath the divider wall 52 (or below the ceiling of uppermost cavity 20a), is an upper jet plate 42' of the next lower cavity 20. This jet plate 42' has openings 44' on its under surface to direct structured air jets 50' downwardly and may be identical in structure to jet plate 42 but simply inverted for ease in manufacturing and field use. This upper jet plate 42' may be independently supported on a ledge 60 to be removed and inserted without adjustment or removal of the rack 34 and the lower jet plate 42.

Referring now to FIGS. 3 and 4, the wire rack 34 and lower jet plate 42 may be inserted together or individually as indicated by arrow 69 into a cooking cavity (for example, cavity 20b). In this orientation, a rear edge of the wire rack 34 may fit beneath a capture flange 80 attached to a rear inner wall of the cooking cavity 20b compressing the wire rack 34 and lower jet plate 42 against the upper surface of the divider wall 52. In this position, closure of the door (shown, for example, in FIG. 4) will compress the front gasket 58 against the inner surface of the glass panel 26 completing the sealing process and described in further detail below.

Front Sealing Elastomeric Gasket

Referring now to FIGS. 2 through 5, a front gasket 58 is supported by the divider wall 52 at a forwardly open rectangular channel 72 at its front edge. The rectangular panel 27 of the divider wall 52 provides a generally planar upper surface 62 and supports at its front edge an outwardly facing forwardly open rectangular channel 72 (facing forwardly at the front edge of the divider wall 52). The forwardly open rectangular channel 72 may be provided by a downwardly extending flange at the front edge of the rectangular panel 27 defined by a rearward extending bend or jog 53 joined to a rearwardly extending horizontal wall 54 joined at a rear edge by a downwardly extending vertical wall 55 and further joined at a bottom edge by a forwardly extending horizontal wall 56 to form the top 54, rear 55, and bottom 56 walls of the forwardly open rectangular channel 72 extending along a length of the front edge.

The channel 72 receives a rearwardly extending supporting rib 66 of the front gasket 58, the remainder of which extends forward toward the door 28 from the channel 72 to provide a frontmost sealing portions 67 extending generally outwardly from the divider wall 52 to seal against the glass door surface 26 separating the cavities 20.

Figure 5:
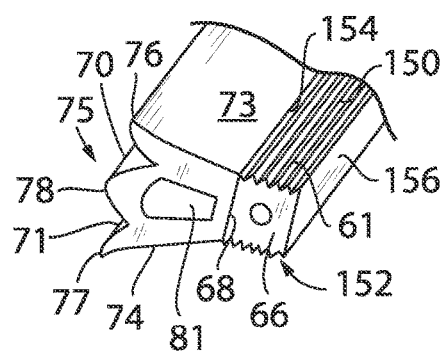
FIG. 5 is a fragmentary, perspective view of the forward-facing gasket of the divider wall of FIG. 4, which engages the glass panel of the door.

Referring to FIGS. 4 and 5, the front gasket 58 may extend in cantilevered fashion away from the divider wall 52 at its front edge, along the full lateral extent of the divider wall 52 and extend laterally past the outer left and right front edges of the divider wall 52 to fully seal the corners of the divider wall 52 with the corners of the cavities 20.

The supporting rib 66 of the front gasket 58, supported within the rectangular channel 72, is defined by a rectangular bar extending longitudinally along the rectangular channel 72 of the divider wall 52 and having an upper surface 150 opposite a lower surface 152 carrying a plurality of ridges 61 extending longitudinally therealong, and planar front and rear surfaces 154, 156 contacting the sealing portion of the front gasket 58 and the rear wall of the channel 72, respectively. The supporting rib 66 is compressed along a direction between the upper surface 150 and lower surface 152 to be tightly received within the rectangular channel 72.

The sealing portion of the front gasket 58 extending forward from the supporting rib 66 has a generally trapezoidal cross section having a rear end 68, defining a small base of the trapezoid, attached to the supporting rib 66 opposite a front end 75, defining a large base of the trapezoid, extending outwardly toward the glass door surface 26. The rear end 68 and front end 75 are joined at their upper and lower ends by an upper surface 73 sloping upward to the front end 75, and a lower surface 74 sloping downward toward the front end 75, respectively. The sloping surface of the upper surface 73 draws moisture away from the front end 75 contacting the glass door surface 26 toward the rear end 68 of the front gasket 58 as indicated by arrow 180.

The front end 75 of the gasket 58 further provides multiple, horizontal, parallel sealing lips 76, 77, and 78 providing multiple longitudinal lines of contact separately sealing against the glass panel 26.

An upper inwardly concave bevel cut 70 extends laterally along the front gasket 58 below an upper longitudinal lip 76 and above the middle longitudinal lip 78 of the front gasket 58. The upper lip 76 provides an upwardly curving convex fin extending upwardly from the upper surface 73 and flexing to hold sealing portion 63 against the glass door surface 26 along the full lateral extent of the front gasket 58 to contact the glass panel 26. The upwardly extending upper lip 76 prevents the collection of moisture on the glass panel 26 by naturally guiding moisture away from the upper lip 76.

A lower inwardly concave bevel cut 71 extends laterally along the front gasket 58 below the upper concave bevel cut 70 and below the middle longitudinal lip 78 and above a lower longitudinal lip 77 of the front gasket 58. The lower lip 76 provides a downwardly curving convex fin extending downwardly from the lower surface 74 and flexing to hold sealing portion 63 against the glass door surface 26 along the full lateral extent of the front gasket 58.

As noted, the upper concave bevel cut 70 and lower concave bevel cut 71 flank a forwardly extending center lip 78 providing a convex ridge extending the full lateral extent of the front gasket 58 to contact the glass panel 26 proximate a vertical center of the front gasket 58. The convex ridge may be rounded to allow for broad surface contact of the center lip 78 with the glass panel 26.

The upper lip 76, lower lip 77 and center lip 78 sealingly engage the glass panel 26 of the door 28 when the door 28 is closed to provide three separate longitudinal contact surfaces sealing against the glass panel 26 under compression. An interior of the front gasket 58 may be hollowed by a rectangular channel 81 extending along the length of the front gasket 58 to allow for easier compression of the front gasket 58 in a direction between the front end 75 and rear end 68. Generally, the front gasket 58 fully seals each cavity 20 preventing passage of heated air or steam between cavities 20*a-c* along the inner surface of the glass panel 26.

The front gasket 58 may be constructed of a resilient elastomeric material such extruded rubber, sponge rubber, silicone, or fluorosilicone allowing the front gasket 58 to seal larger uneven gaps between the glass panel 26 and the door 28 while withstanding pressure points where compression is greater to rebound quickly after compression.

Uniform Condensation Chamber Connections

Figure 6:
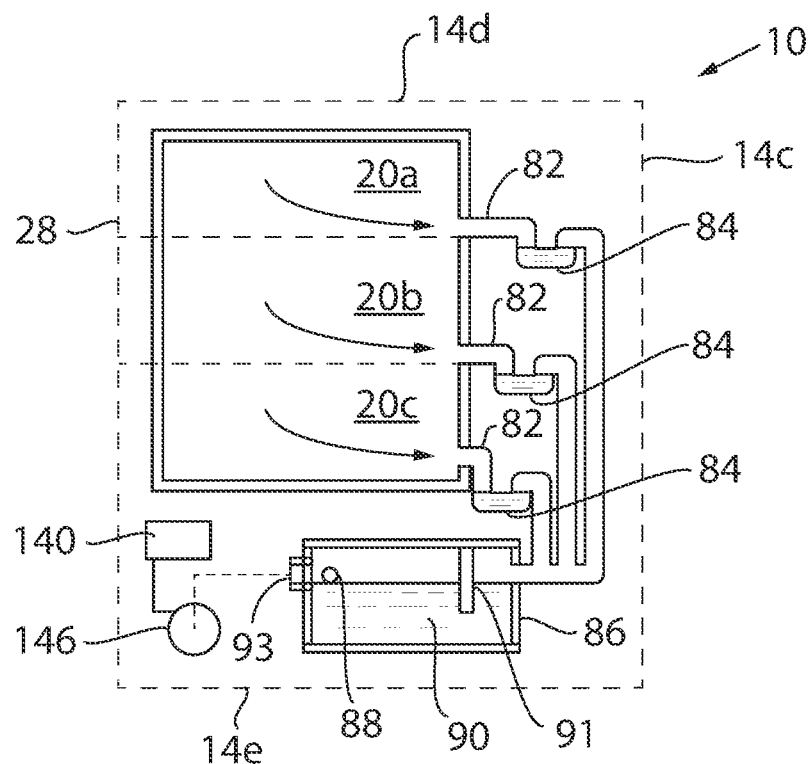
FIG. 6 is a diagrammatic front elevational view in cross-section of the cooking cavities of FIG. 1 showing connection of the drain tubes for multiple cavities to a common sump through back-flow restrictors preventing the circulation of steam between cavities through the drain connection.

Referring now to FIG. 6, each of the oven cavities 20 may provide matching connections between the oven cavity 20 through drain tubes 82 to a common condenser sump 86 positioned below oven cavity 20 and may provide matching direct paths through exit port 88 to the atmosphere to provide improved consistency in the control of airflow steam and heating.

The drain tubes 82 may each be connected to the common condenser sump 86 through separate drain tubes or may be combined to a single drain tube which is then connected to the condenser sump 86. The drain tubes 82 eliminate excess heat loss by providing a small exit port opening.

The drain tubes 82 for each of the cavities 20*a*, 20*b*, 20*c* may be optionally connected to P-traps 84 which may be partially filled with water to provide a trap preventing direct gas flow and offer a resistance to backflow that prevents steam or over-pressurized gases from moving between cavities 20 instead of exiting through conduits leading to a condenser sump 86. Generally, the P-traps 84 allow for the escape of liquid as liquid fills the lower trap portion and overflows into a downwardly extending drain pipe to the condenser sump 86. In this way combined drainage to a single shared reservoir can be provided without risk of moisture passing between cavities 20 through that common connection.

The condenser sump 86 may hold a pool of cooling water, for example, as described in U.S. Pat. No. 8,997,730 assigned to the assignee of the present invention and hereby incorporated by reference. The condenser sump 86 may provide for a grease trap, for example using a divider wall 91 extending slightly downward into the water 90 to block the passage of grease to a water drain 93. It will be appreciated that other backflow limiting mechanisms may be used to prevent the interchange of gases between cavities 20 including, for example, one-way valves, resistive constrictions, and the like.

Independent Control of Steam Generation

Figure 7:
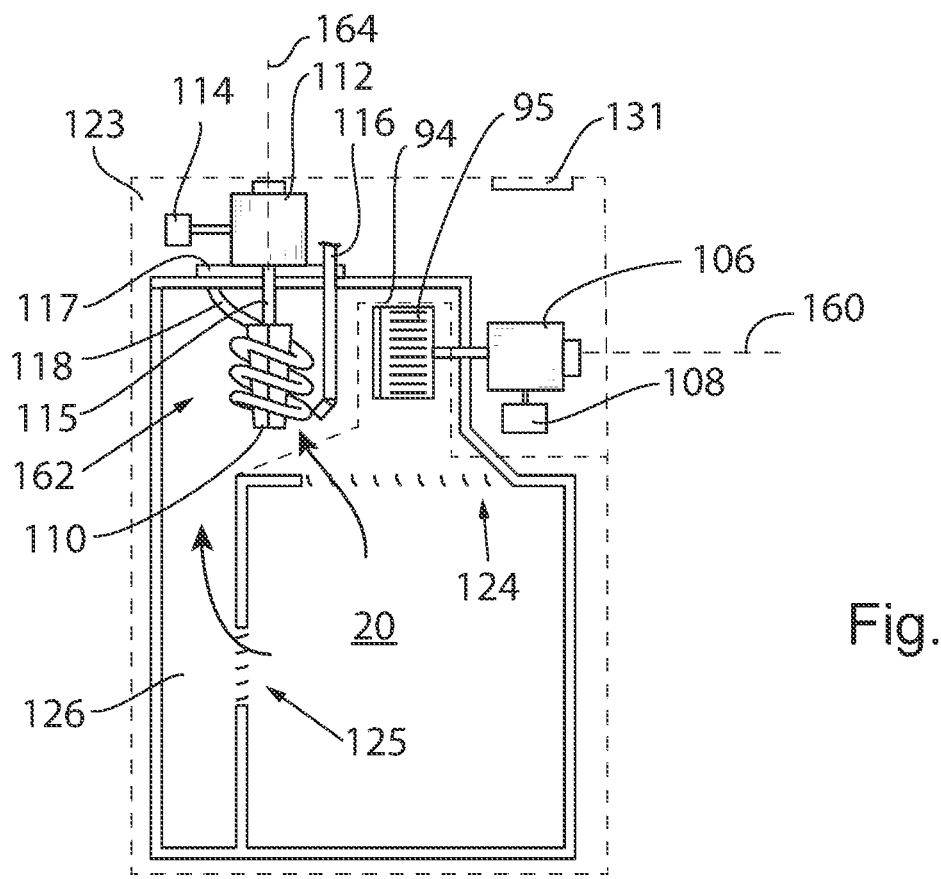
FIG. 7 is a top plan view in cross-section through a cavity of FIG. 1 showing the rear location of a fan heater assembly and a steam generator assembly associated with that cavity.

Referring now to FIGS. 3 and 7, positioned rearward from each cavity 20 is a convection fan 94, for example, being a centrifugal fan having a squirrel cage impeller 95 surrounded by an involute housing 96. The convection fans 94 may be mounted with rotation of the squirrel cage impeller 95 about a horizontal axis 160 extending from the right to left wall of the oven 10 with the squirrel cage impeller 95 centered with respect to the volume of the cavity 20.

The volume of the housing 96 may provide an opening 98 directing air along a tangent line 99 that is tipped upward with respect to horizontal by about 30 degrees allowing a larger squirrel cage impeller 95 to be fitted within the compact height dimensions of the cavity 20 while still delivering air to the upper and lower jet plates 42. A baffle plate 100 faces the opening 98 at a distance 102 less than a smallest dimension 104 of the opening 98 to provide high turbulence and high resistance to airflow that evens the distribution of airflow into the channels 79 into the upper jet plates 42' and lower jet plates 42. In this respect, the baffle plate 100 may be asymmetric about the tangent line 99 to provide desired partitioning of the airflow and also operate when cleaning solution must be distributed through the jet plates 42.

Referring to FIG. 7, each squirrel cage impeller 95 may be driven by a convection fan speed-controlled motor 106 operated by convection solid-state motor drive 108. In this respect the squirrel cage impeller 95 propels heated air with the air from each squirrel cage impeller 95 passing into the oven cavity 20 providing convection cooking while also evaporating excess moisture. Heat may be vented by a vent fan 131 or the like.

Figure 12:
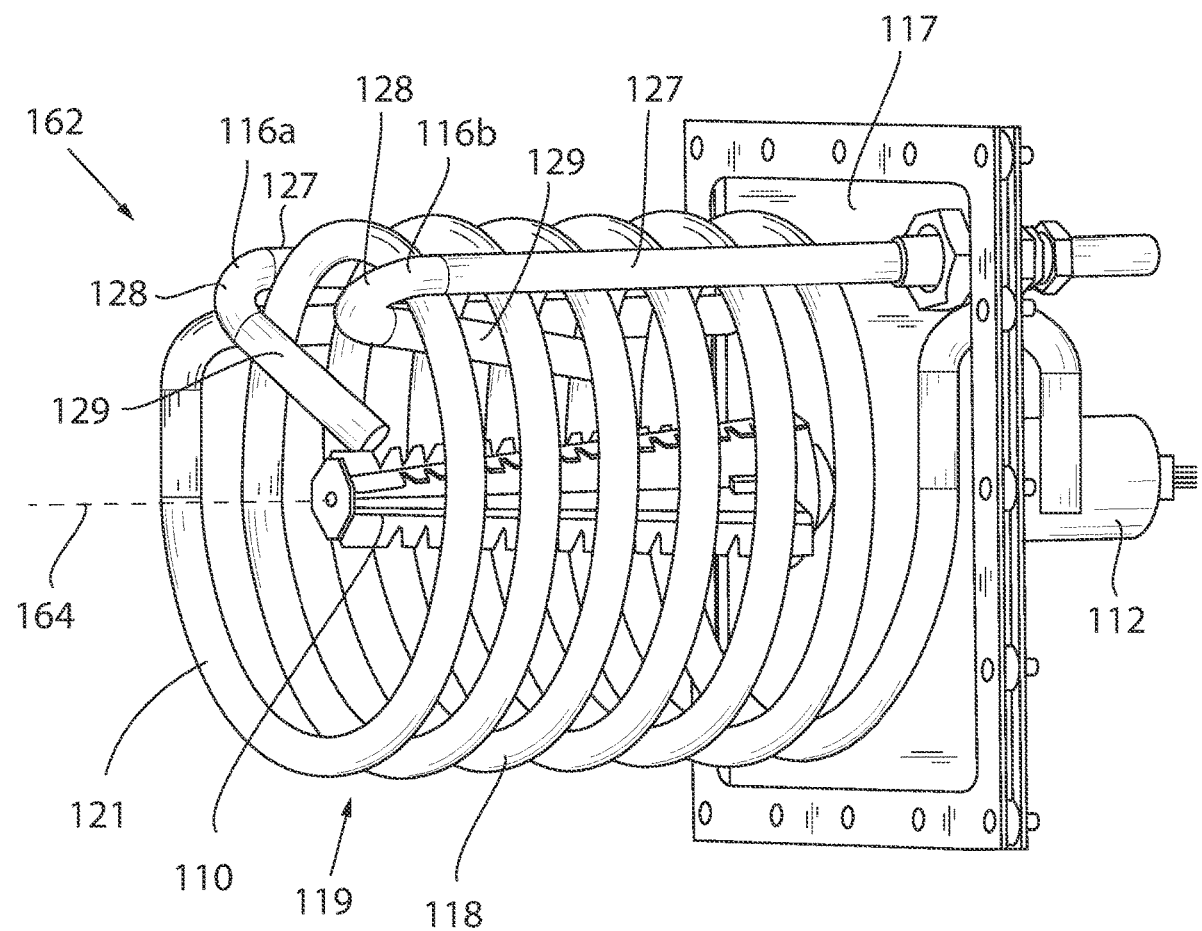
FIG. 12 is a fragmentary perspective view of the steam generator of FIG. 7 showing a heating coil surrounding the spinner and water dispensed at two points along a length of the spinner.

Turning now to FIG. 12, a water atomizer 162, also positioned rearward from each cavity 20 leftward from the squirrel cage impeller 95 (for example), provides a pair of water injection nozzles 116*a*, 116*b* dispensing a stream of water or water droplets onto a rotating spinner 110. The spinner 110 of the water atomizer 162 may be mounted for rotation, independent of rotation of the squirrel cage impeller 95, on a shaft 115 driven by a spinner speed-controlled motor 112 operated by a spinner solid-state motor drive 114 and translating the rotation to the spinner 110.

The spinner 110 may be rotated about a horizontal axis of rotation 164 perpendicular to the horizontal axis 160 of the squirrel cage impeller 95 extending from the rear wall of the oven 10 to the front opening 18. The speed of rotation of the rotating spinner 110 may be switched between off and a constant on speed or be controlled to affect an amount or rate of steam introduced into the cavity 20.

The water injection nozzles 116*a*, 116*b* may disperse freshwater onto the rotating spinner 110 to break up the water and emit a fine spray of water that is heated by a helical heater tube 118 surrounding the spinner 110 as described in further detail below. Water to the injection nozzles 116*a*, 116*b* may be controlled by an electronically controlled valve.

Therefore, the convection fan speed-controlled motor 106 and the spinner speed-controlled motor 112 are independently controlled to provide separate control of a heating of the oven cavity 20 and steam generation of the oven cavity 20.

Rotating Spinner of the Water Atomizer

Referring now to FIGS. 7, 8*a* and 8*b*, 11 and 12, the shaft 115 of the spinner 110 may extend forwardly along the axis of rotation 164 through a vertical wall 117 separating the spinner 110 from the spinner speed-controlled motor 112/ solid-state motor drive 114 and also supporting injection nozzles 116*a*, 116*b* extending therethrough.

Referring specifically to FIGS. 8*a* and 8*b* and 11, the spinner 110 of the water atomizer 162 may be defined by shaft 115 extending along the axis of rotation 164 and supporting four equally spaced fins 134*a*, 134*b*, 134*c*, 134*d* (for example) spaced 90 degrees apart around the axis of rotation 164, each fin 134 defined by a flat plate extending radially outward from the shaft 115 along a length of the shaft 115. The fins 134 are flanked along the length of the shaft 115 by two parallel disks 168, 170 coupled to the shaft 115, with a proximal disk 168 positioned adjacent to the vertical wall 117 and a distal disk 170 positioned away from the vertical wall 117 at a distal end of the shaft 115. The disks 168, 170 are generally octagonal in shape with the proximal disk 168 having a greater diameter than the distal disk 170.

The fins 134 are defined by generally trapezoidal plates 171 having a proximal edge 173 attached to an inner surface of the proximal circular plate 169 opposite a distal edge 175 attached to an inner surface of the distal disk 170. The proximal edge 173 and distal edge 175 are joined by an inner edge 172 extending proximate the shaft 115 opposite an outer edge 174 extending between an outer diameter of the disks 168, 170 and tapering inwardly from the proximal disk 168 to the distal disk 170 to define the trapezoidal shape of the plates 171.

Referring specifically to FIG. 11, the outer straight edges 174 of each fin 134 is bent at 90 degrees to provide a longitudinal ledge 176 extending along a tangent of motion of the fin 134 in a direction of rotation 177 of the fins 134. In cross section, each fin 134 may form an "L" or reversed "L" shape wherein the longitudinal ledge 176 is able to cut and capture water as the spinner 110 is rotated in direction 177. The longitudinal ledge 176 has an outer serrated edge 178, for example, formed by saw tooth cuts, extending substantially an entire length of the longitudinal ledge 176. The serrated edge 178 aiding to break up the water droplets into a fine spray as water leaves to rotating spinner 110.

Referring now to FIG. 12, the injection nozzles 116*a*, 116*b* provide elongate tubes extending forwardly from the vertical wall 117 so that the outlets are proximate a distal end of the spinner 110 and a proximal end of the spinner 110, respectively, and dispensing a stream of water or water droplets onto the distal end and proximal end of the spinner 110 as it is rotated, causing the water to be captured by the longitudinal ledges 176 and deflecting the water circumferentially about the axis of rotation 164.

The helical heater tube 118 may be placed concentrically around the spinner 110 so that the fine spray of water from the spinner 110 is dispersed outward evenly about the inner surface of the helical heater tube 118 and along a length of the helical heater tube 118. The helical heater tube 118 may include approximately six loops or turns as it extends forwardly from the vertical wall 117 from a proximal end 120 to a distal end 121 away from the vertical wall 117 where the distal end 121 of the helical heater tube 118 returns to the vertical wall 117 in a straight line path along an exterior of a coil 119 formed by the helical heater tube 118. By distributing the water evenly about the inner surface of the helix of the heater tube 118, stress and possible damage to the helical heater tube 118 is reduced.

The distally positioned injection nozzle 116*a* may include a straight section 127 extending forwardly from the vertical wall 117 at an upper left end of the helical heater tube 118 along an exterior of the coil 119 toward the front of the helical heater tube 118, a curved section 128 extending over the distal end 121 of the coil 119, and a straight section 129 extending into an interior of the coil 119 and terminating near the distal end 121 of the coil 119 and dispensing water about one-quarter to one-third from the distal end 121 of the coil 119 (e.g., at about turn five of a six turn coil) onto the spinner 110. The water may be dispensed at an approximately 45 degree angle downward toward the attached end of the spinner 110.

The proximally positioned injection nozzle 116*b* may include a straight section 127 extending forwardly from the vertical wall 117 at an upper right end of the helical heater tube 118 along an exterior of the coil 119 toward the front of the helical heater tube 118, a curved section 128 extending over the distal end 121 of the coil 119, and a straight section 129 extending into an interior of the coil 119 and terminating near the proximal end 120 of the coil 119 and dispensing water about one-quarter to one-third from the proximal end 120 of the coil 119 (e.g., at about turn two of a six turn coil) onto the spinner 110. The water may be dispensed at an approximately 45 degree angle downwardly toward the attached end of the spinner 110.

The water atomizer 162 may be positioned in a side compartment 123 behind and to the left of the cavity 20 and to the left of the centrifugal fan 94 which may receive air from the side compartment 123 to be expelled through the channels 79 (for example, shown in FIG. 3) into the jet plates 42 and returned through a vent 124 at the rear of each cavity 20 and through a side vent 125 and side channel 126 to be heated by the helical heater tube 118.

Jet Plate Cleaning Ports

Referring now to FIGS. 9 and 10, a cleaning of the cavities 20 may be provided through the use of a cleaning manifold 141 extending vertically along a rear corner of the cooking cavities 20, for example, adjacent to the drain tubes 82 and providing nozzles 143 extending into the jet plates 42 installed within the cavities 20 from vertical sidewalls of the cavities 20 to direct a spray of water into interior surfaces of the jet plates 42 and perpendicular to the flow of the air through the jet plates 42.

Referring to FIG. 10, the jet plates 42, 42' may include a port 144 positioned along a rear corner of the jet plate walls, and along a vertical sidewall of the jet plate, allowing the nozzles 143 of the cleaning manifold to direct the spray of water into the interior surface of the jet plates 42, 42'.

The port 144 of the upper jet plate 42' may be circular or oval to receive the nozzle 143*a* above (as shown in FIG. 13) or below the internal horizontal baffle 41 of the upper jet plate 42' to allow the water to drain downward through the slots and openings 44 into the cavities 20. In one embodiment, the cleaning spray may be sprayed directly into the air flow from inlets 190 of the jet plate 42'. In another embodiment, the cleaning spray may be sprayed above the internal horizontal baffle 41 to allow suds to flow downward into the air flow of the jet plate 42' as further described below. Optionally, the port 144 of the lower jet plate 42 may receive the nozzle 143c above or below the internal horizontal baffle 41 of the upper jet plates 42 to allow the water to be drawn upward through the slots and openings 44 into the cavities 20.

Referring to FIG. 7, air from the interior of the jet plates 42, 42' is then drawn into the vents 125 and 124 for circulation by the fan 94 and possible heating by the helical heater tube 118 and through the interior of the jet plates 42. Excess water is collected by the drain tubes 82 and provided to the sump 86 where, as activated by the controller 140, a pump 146 (shown in FIG. 6) may pump water back through the manifold 141 for constant recirculation. In this process, a cleaning surfactant or the like may be introduced into the water for improved cleaning ability. Generally, the upper surface of the upper jet plates 42 or the channels 194 through the jet plates described above with respect to FIG. 3 may slope downwardly toward the rear drain tubes 82 to provide complete drainage of the cavities 20 (as shown in FIG. 3).

Jet Plate Spray Diverter and Atomizer

Referring now to FIGS. 13, 14 and 15, a cleaning of the cavities 20 may be provided through the use of a cleaning manifold 141, similar to the one shown in FIGS. 9 and 10, whereby the cleaning manifold 141 extends vertically along a rear corner of the cooking cavities 20 and provides multiple horizontally extending nozzles, e.g., 143a, 143b, 143c of the cleaning manifold 141 extending through the inner wall of the oven 10 through ports 181, 183, etc. The ports 181, 183, etc. through the inner wall of the oven 10 are positioned at multiple vertical positions of the oven 10 and within each cavity 20 and are thus able to clean the upper and lower surfaces and interior plenum of the upper jet plate 42' and the upper and lower surfaces and interior plenum of the lower jet plate 42.

As previously described with respect to FIGS. 3 and 4, the upper jet plate 42' of each cooking cavity 20 is supported on ledge 60 at a top of each cooking cavity 20 and is able to be removed and inserted from the oven 10 along a removal and insertion direction 182. Each of the upper jet plates 42' provides a plenum provided by the internal horizontal baffle 41 and a lower air distribution plate 186 having slots and openings 44' on its undersurface to direct structured air jets 50' downwardly. Air or airflow 187 which may be heated enters from a vent 188 of the oven 10 into an inlet 190 of a vertically extending rear sidewall 192 of the upper jet plate 42' abutting the rear wall 14c of the oven 10. The air flow 187 further extends through a horizontally extending channel 194 defined by an inner volume of the upper jet plate 42' between the internal horizontal baffle 41, the lower air distribution plate 186, and vertically extending sidewalls. The general construction of the jet plates 42' may be as generally described in U.S. Pat. No. 10,088,173, assigned to the present applicant and hereby incorporated by reference.

Referring specifically now to FIGS. 13 and 14, the horizontally extending nozzle 143a may direct a spray of water onto the upper surface 218 of the internal horizontal baffle 41 of the upper jet plate 42'. The upper surface 218 of the internal horizontal baffle 41 may be exposed without an enclosing wall. The internal horizontal baffle 41 may be sloped inward and downward from horizontal by an angle 196 from a rear of the cavity 20 to a front of the cavity 20 so that the slope promotes water flow to a front end 198 of the internal horizontal baffle 41. The buildup or pooling of water 199 at the front end 198 of the internal horizontal baffle 41 helps to promote drainage of soapy water downward into the horizontally extending channel 194 (through small holes in the internal horizontal baffle 41 further described below) and the creation of suds or soapy bubbles for improved cleaning of the upper jet plate 42' and its interior plenum. It is contemplated that the angle 196 of the internal horizontal baffle 41 may be between 5 degrees and 15 degrees from horizontal.

The front end 198 of the internal horizontal baffle 41 may be perforated with multiple small holes 210, for example, four holes distributed toward and along a front edge 212 of the internal horizontal baffle 41 and two holes toward and along each side of the internal horizontal baffle 41 and toward the front end 198 of the internal horizontal baffle 41. For example, the holes 210 may be in only the front half of the upper plate 148. In this respect the holes 210 may be distributed near the perimeter of the front end 198 of the internal horizontal baffle 41 towards the area of water buildup. The holes 210 may be much smaller than the openings 44 of the upper jet plate 42', for example, at least ½ to ¹⁄₁₀ the area of the openings 44 such that only small amounts of airflow and moisture are permitted to flow through the holes 210 and are not large enough to interfere with the downward structured air jet 50' flow from the upper jet plate 42' into the cavity 20 below. The airflow upward through the holes 210 (when the blower is on or high) help to promote the creation of suds or soapy bubbles in the cleaning of the cavities 20 while the drainage of water downward through the holes 210 (when the blower is off or low) helps to promote flow of cleaning fluid into the horizontally extending channel 194.

A rear end 214 of the upper jet plate 42' may include a port 216, shown in FIGS. 13 and 14, extending through a right vertical sidewall 200 of the upper jet plate 42'. The port 216 may be circular or oval and correspond with a position of the nozzle 143a to open to a position above an upper surface 218 of the internal horizontal baffle 41 such that the spray of water is emitted over the upper surface 218.

Referring to FIG. 13, a spray diverter 220 is positioned on the upper surface 218 of the internal horizontal baffle 41 proximate the right vertical sidewall 200 and to the left of the port 216 to receive the spray of water and redirect the water over the upper surface 218. The spray diverter 220 provides a rectangular metal sheet perforated with a pattern of circular holes 224 punched therein and bent at an approximately 90° angle to form an "L" shaped plate.

A lower panel 226 of the spray diverter 220 is attached to the upper surface 218 of the upper jet plate 42', or alternatively attached near the upper surface 218 of the upper jet plate 42' but spaced above that upper surface 218, and is generally centered around the port 216. The lower panel 226 provides a planar sheet extending along the upper surface 218 of the internal horizontal baffle 41 with a length defined between a front and rear of the jet plate 42' and a width defined between a right and left of the jet plate 42'. The length of the lower panel 226 may be between 3 and 5 inches and the width of the lower panel 226 may be between 2 and 3 inches.

The lower panel 226 bends along a leftmost edge 230 upwards to form a vertical panel 228 of the spray diverter 220 extending approximately parallel to the right vertical sidewall 200 of the upper jet plate 42' to provide an obstructive wall to water sprayed away from the right vertical sidewall 200 toward the left vertical sidewall. A length of the vertical panel 228 defined between a front and rear of the jet plate 42' may be between 3 and 5 inches and a height of the vertical panel 228 defined upwards from the jet plate 42' may be between 1 and 2 inches.

Figure 19A:
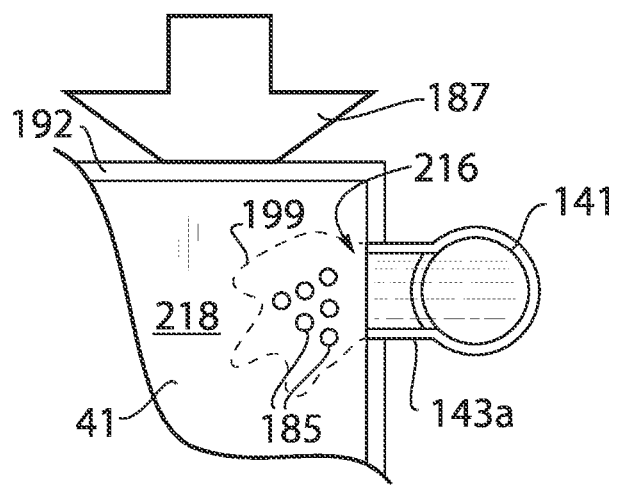
FIGS. 19a and 19b is a top plan view in cross-section and a side elevation view of the baffle wall of FIG. 13 and FIG. 14 showing small holes positioned in front of the cleaning inlet port providing for atomization of the water from the jet spray when aspirated through the holes into the jet plate by venturi effect created by the jet air flow flowing through the interior of the jet plate.
Figure 19B:
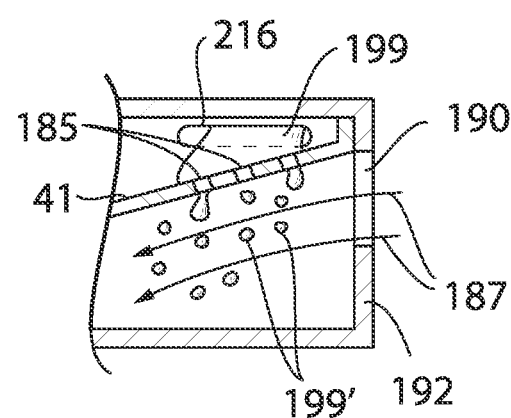

Referring momentarily to FIGS. 19a and 19b, in one embodiment, the upper surface 218 of the internal horizontal baffle 41 may provide for a series of small holes 185 positioned immediately in front of the port 216 through which water 199 is discharged from nozzle 143a. While much of the water 199 will flow toward the front of the shelf as discussed above with respect to FIG. 13, high-speed airflow 187 passing below the internal horizontal baffle 41 but along its surface will create a low pressure venturi drawing liquid droplets of water 199' in atomized form through the holes 185 to promote a cleaning mist of water 199 scouring the volumes below the internal horizontal baffle 41 from a point close to the rear wall 192. It in this regard, the holes 185 may be relatively small to promote atomization, for example, less than one quarter of an inch and typically less than 3/16 of an inch in diameter and will be positioned to receive a substantially continuous sheet of water over their surface before that water is drawn through the holes 185.

Referring now to FIG. 13, as pressurized water spray is emitted from the nozzle 143a through the port 216, water hits the perforated pattern of the lower panel 226 and vertical panel 228 of the spray diverter 220 to deflect water spray onto and over the upper surface 218 of the upper jet plate 42' at multiple directions for more disperse water spray. The outer edges of the spray diverter 220 may be uneven, formed by the perforated pattern, to further create dispersion of the water spray.

It is understood that the upper jet plate 42' may be inverted to provide the lower jet plate 42. In this respect, a pressurized water spray may be emitted from the nozzle 143c through the port 216 to clean the horizontally extending channel 194 and the upper surfaces of the lower jet plate 42 when water is drawn upwards through the holes 210.

Referring again to FIGS. 10, 13 and 15, an additional water spray may be emitted into each cavity 20 from a second nozzle 143b directed into the port 183 at an upper rear corner of each cooking cavity 20, below the upper jet plate 42' but above the lower jet plate 42 to dispense water into the cavity 20 and thus spraying the lower surface of the upper jet plate 42' and upper surface of the lower jet plate 42 to clean the jet plate surfaces and horizontally extending channel 194 of the lower jet plate 42. The water spray emitted from the second nozzle 143b into the port 183 is emitted toward the top of each cavity 20 to fall downward onto the lower jet plate 42 thus flooding the upper surface of the lower jet plate 42 with cleaning solution.

The convection fan 94 of the oven 10 may be operated at variable speeds, as further discussed below. At high speeds, the fan 94 encourages airflow through horizontally extending channel 194 of the lower jet plate 42 and upward through the slots and openings 44 of the upper surface of the lower jet plate 42 thus promoting the production of suds or soapy bubbles at the upper surface of the lower jet plate 42 with minimized drainage back into the interior of the jet plate 42. Similar to the airflow provided through the holes 210 of the upper jet plate 42' described above, the upward airflow assists in the creation of suds or soapy bubbles by injecting air into the cleaning solution. At lower speeds, the convection fan 94 encourages drainage of suds downward into the interior of the jet plate 42.

The suds or soapy bubbles are distributed throughout the oven cavity 20 through return air paths by drawing suds or soapy bubbles into the air vents 125, 124 and outward by the fan 94 into the inner plenums thus helping to promote the cleaning of the interior of the jet plates 42, 42'.

Cleaning Schedule

Referring to FIG. 18, a pre-cleaning phase 300 may provide operation of the convection fan 94 at an initial speed of, for example, 70% maximum speed with the pump 146, water spray and steam generator off in order to circulate the heated air throughout the cooking cavity 20 and to allow the cooking cavity 20 to warm up to a desired predetermined temperature. The fan speed may then be decreased to, for example, 50% maximum speed with the pump 146 and water spray off but steam generator on to fill the oven with steam. The fan speed may be further decreased to, for example, 30% maximum speed with the pump 146 on and the water spray and steam generator off to circulate the steam throughout the oven, followed by pump off, water spray on and steam generator off to flood the jet plates 42, 42' with water for the creation of suds as described in detail above.

Next, a cleaning phase 302 may provide alternating cycles of suds circulation 304 (by increasing fan 94 speed, turning on the pump 146, and turning off steam production) and steam production 306 (by decreasing fan 94 speed, turning off the pump 146, and turning on steam production). The temperature of the cooking cavities 20 may be held substantially constant, for example, at approximately 180° F., during the cleaning phase 302. Each suds circulation cycle 304 may be approximately 30 minutes while each steam production cycle 306 may be approximately 3 minutes. In this respect the suds circulation cycles 304 may be at least five to ten times longer than the steam production cycles 306.

Next, a flushing phase 308 may provide cycles of settling 310 (by turning the pump 146 on and then off while the water spray and steam generation are off) followed by cycles of flushing 312 (by turning the water spray on while the pump 146 and steam generation are off) followed by cycles of rinsing 314 (by turning the pump 146 on while the water spray and steam generation are off). The heater of the oven may only be turned on during the rinsing cycles 314, for example, to approximately 140° F., while the heater may be turned off during the settling cycles 310 and the flushing cycles 312. The settling cycle 310, flushing cycle 312, rinsing cycle 314 may be sequentially repeated, for example, up to five times or more times during the flushing phase 308. The settling cycle 310 may be approximately 1 minute with the pump 146 on and 4 minutes with the pump 146 off. The flushing cycle 312 may be approximately 30 seconds cycle while the rinsing cycle 314 may be approximately 2 to 10 minutes long with the duration of the cycle decreasing as the cycles progress, for example, starting at 10 minutes and then progressively decreasing to 5 minutes and then 2 minutes.

Finally, the post cleaning phase 316 may provide operation of the convection fan 94 at, for example, 30% maximum speed, with the pump 146 off, the water spray on, and the steam generator off to fill the cavity with water. The fan speed may be increased to, for example, 100% maximum speed with the pump 146 on and the water spray and steam generator off during descaling. The temperature of the cooking cavities 20 may be at approximately 140° F. during the preceding filling and descaling steps. Then, the fan 94 may be turned off with the pump 146, water spray and steam generator off to allow settling and draining. The water spray may be then turned on while the pump 146 and steam generator are off to fill the cooking cavity 20 with water. The heater may be turned off during the preceding settling, draining and filling steps. Lastly, the pump 146 is turned on while the water spray and steam generator are off for a final rinse. The temperature of the cooking cavities 20 may be approximately 140° F. during the final rinse step.

Rotating Spinner Floating Mount

Figure 16:
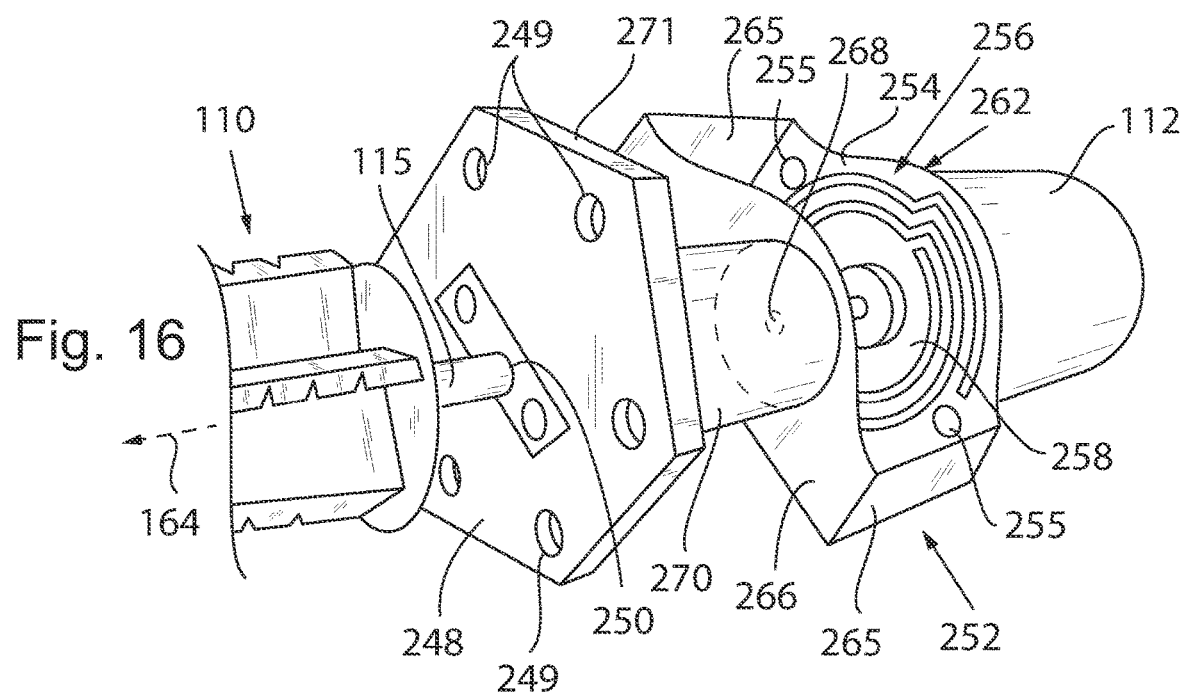
FIG. 16 is a fragmentary perspective view of the spinner of the steam generator of FIG. 7 driven by a speed-controlled motor.
Figure 17:
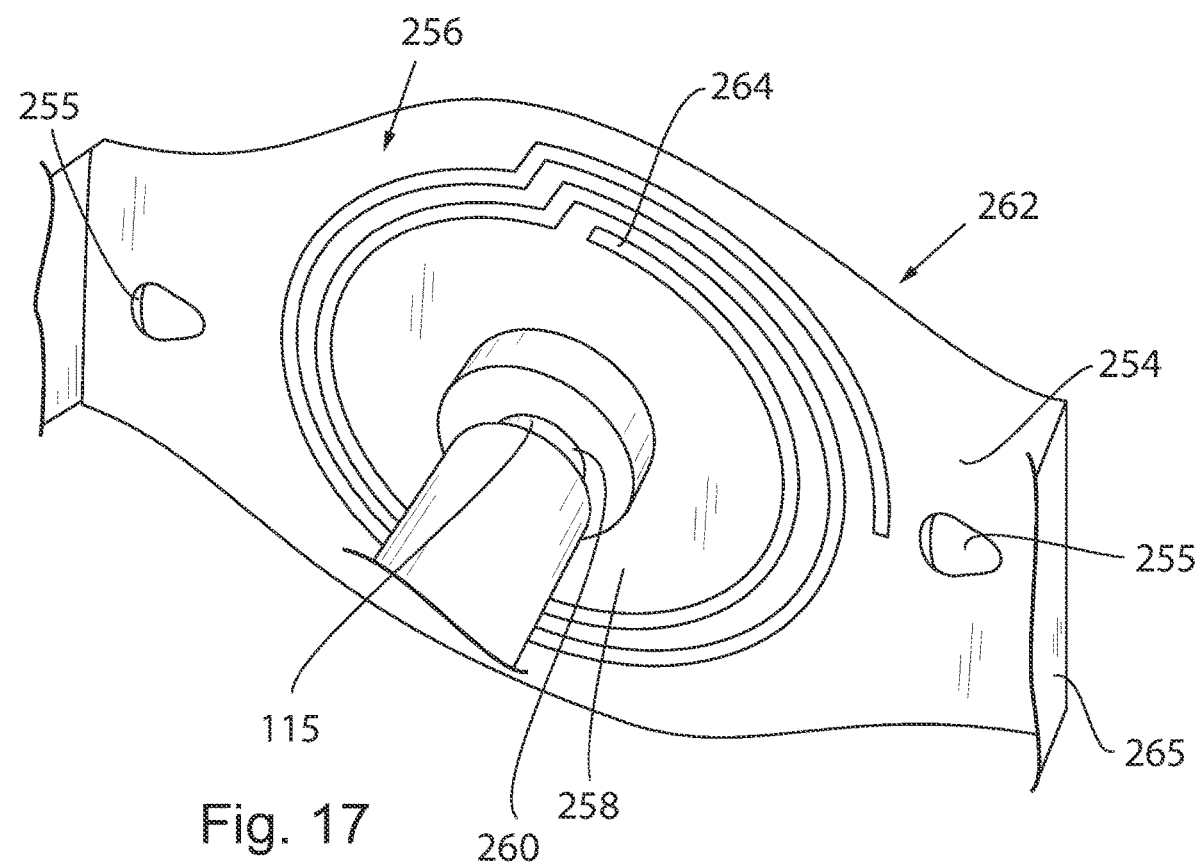
FIG. 17 is an enlarged fragmentary perspective view of a floating mount of the speed-controlled motor.

Referring now to FIGS. 16 and 17, the rotating spinner 110, for example, as shown and discussed previously with respect to FIGS. 8 and 11, is supported by a shaft 115 extending along the axis of rotation 164 through the vertical wall 117 of the multizone oven 10 into a side compartment 123 of the oven 10, for example as shown in FIG. 7, situated behind and to the left of the cavity 20. The shaft 115 may be supported for rotation on the vertical wall 117 by a vertically extending wall mount 248 attached to the vertical wall 117. The wall mount 248 may be a hexagonal metal plate carrying a circular opening 250 in the center allowing the shaft 115 to extend therethrough and having mounting holes 249 surrounding the opening 250 allowing, for example, screws or bolts to extend through the holes 249 for mounting the wall mount 248 to the vertical wall 117.

The vertical wall 117 separates the spinner 110 and cavity 20 from a speed-controlled motor 112 transferring rotating motion to the spinner 110. The speed-controlled motor 112 is generally housed within the side compartment 123 and is supported by a motor mount 252 attached to a vertical support wall of the side compartment 123 generally fixed with respect to the vertical wall 117. The motor mount 252 has a front plate 266 spaced from a rear plate 254 to be further described below.

Mounted between the vertical wall 117 and the motor mount 252 is a cylindrical housing 270 surrounding the shaft 115 and allowing the shaft 115 to extend by a greater distance from the wall 117. The shaft 115 extends through the cylindrical housing 270 between opposed circular ends of the cylindrical housing 270 and providing a protective housing around the shaft 115. The opposed circular ends of the cylindrical housing 270 are attached to the vertical wall 117 and the front plate 266 of the motor mount 252, respectively. The cylindrical housing 270 may have a length between 2 and 4 inches therefore separating the vertical wall 117 and the speed-controlled motor 112.

An exterior of the cylindrical housing 270 may be surrounded by an insulating material 271 such as fiberglass batting positioned between the vertical wall 117 and the motor mount 252 and further abutting the rear surface 272 of the vertical wall 117 and wall mount 248. The cylindrical housing 270 and insulating material 271 help to promote insulation of the speed-controlled motor 112 from heat emanating from the cavity 20 through the vertical wall 117.

The left and right edges of the front plate 266 of the motor mount 252 may provide left and right rearwardly extending arms 265, respectively, separating the front plate 266 from the rear plate 254 by a space and connecting the front plate 266 to the rear plate 254. The front plate 266 and the rear plate 254 may be generally rectangular plates, and the arms 265 are rectangular plates extending therebetween. The front plate 266 may include a central hole 268 corresponding with a central hole 260 of the rear plate 254 to concurrently receive the shaft 115 through the motor mount 252 along the axis of rotation 164. It is understood that the shaft 115 may have an extended length allowing it to extend a greater distance away from the vertical wall 117 to the speed-controlled motor 112.

Referring specifically to FIG. 17, the rear plate 254 may include a pair of lateral holes 255 on the left and right of the central hole 260 allowing the rear plate 254 to be mounted to the vertical support wall, for example, by screws or bolts.

The rear plate 254 also supports a floating mount 256 supporting the speed-controlled motor 112 attached at a rear surface 262 of the plate. The floating mount 256 of the rear plate 254 is defined by a central disc 258 carrying the central hole 260 receiving the shaft 115 therethrough and supporting the speed-controlled motor 112 on the rear surface 262. The central disc 258 is surrounded by a spiral cut-out 264 encircling the central disc 258 and receding away from the central disc 258 at least two full turns, or at least two 360° turns. In this respect, the central disc 258 is able to shift in angle with respect to the plane of the rear plate 254 and in directions away from the rear plate 254 through flexure of the cut-out to 64 while still being restrained and supported by the floating mount 256 against rotation. The floating mount 256 provides an improved engineering tolerance in the position of the speed-controlled motor 112 with respect to the shaft 115 and axis of rotation 164 which is constrained by, for example, the wall mount 248 and the motor mount 252

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. A multi-cavity oven comprising:
   a housing having inner cavity walls defining an oven cavity;
   at least one removable shelf fitting within the inner cavity walls and providing an outer rectangular frame defined by front, back, left and right sidewalls;
      an upper wall extending between the front, back, left and right sidewalls at least partially below the top edges of the sidewalls;
      a lower wall extending between the front, back, left and right sidewalls below the upper wall;
      wherein a space between the upper wall and lower wall defines an interior horizontally extending passageway receiving air and producing air jets directed along a vertical direction out through hole openings within the lower wall of the removable shelf and into the oven cavity; and
   at least one fluid spray nozzle positioned to communicate with the outer rectangular frame of the at least one removable shelf to direct a cleaning fluid above the upper wall of the at least one removable shelf when the removable shelf is positioned within the oven cavity.

2. The multi-cavity oven of claim 1 further including a first and second removable shelf and further comprising a spray manifold supporting at least two fluid spray nozzles configured to deliver cleaning fluid above the upper wall of the first and second removable shelf positioned within the oven cavity.

3. The multi-cavity oven of claim 2 further including a drain manifold wherein the drain manifold further supports at least two drain tubes configured to receive fluid from the interior horizontally extending passageways of the at least two removable shelves positioned within the oven cavity.

4. The multi-cavity oven of claim 3 wherein the drain manifold recirculates water from the at least two drain tubes to the at least two fluid spray nozzles.

5. The multi cavity oven of claim 3 wherein the drain manifold receives fluid received at a bottom wall of the cooking cavity through a drain port of a vertical wall of the cooking cavity and directs the fluid out of the cooking cavity to a common receptacle of cooling water.

6. The multi-cavity oven of claim 2 wherein the spray manifold extends along a rear wall of the inner cavity walls of the oven cavity.

7. The multi-cavity oven of claim 1 wherein the at least one removable shelf provides a first removable shelf with a first horizontally extending passageway and a second removable shelf with a second horizontally extending passageway communicating respectively with vertical upward and vertical downward directed air jets.

8. The multi-cavity oven of claim 7 wherein the at least one fluid spray nozzle delivers cleaning fluid into both the first and second horizontal passageways of the first and second removeable shelves.

9. The multi-cavity oven of claim 1 wherein the at least one fluid spray nozzle extends horizontally into a fluid inlet port within the outer rectangular frame of the at least one removable shelf wherein the fluid inlet port within the outer rectangular frame of the at least one removable shelf emits a spray extending over an upper surface of the upper wall of the at least one removable shelf.

10. The multi-cavity oven of claim 9 wherein the upper surface of the upper wall of the at least one removable shelf is sloped downward from the fluid inlet port of the shelf sidewalls of the at least one removable shelf to an opposite end and the opposite end contains drainage holes permitting a flow of air upward and a flow of fluid downward into the interior horizontally extending passageway.

11. The multi-cavity oven of claim 10 further comprising a diverter plate positioned directly in front of the at least one fluid spray nozzle to receive the cleaning fluid from the at least one fluid spray nozzle.

12. The multi-cavity oven of claim 11 wherein the diverter plate is perforated.

13. The multi-cavity oven of claim 12 wherein the diverter plate has a horizontal plate and a vertical plate, the horizontal plate extending along the upper wall of the at least one removable shelf and the vertical plate extending perpendicular to the upper wall of the at least one removable shelf to block a flow of the cleaning fluid from the at least one fluid spray nozzle.

14. The multi-cavity oven of claim 12 wherein the diverter plate is attached to the upper surface of the upper wall of the at least one removable shelf.

15. The multi-cavity oven of claim 10 wherein the at least one removeable shelf provides holes in the upper wall of the at least one removable shelf positioned directly in front of the at least one fluid spray nozzle to separate the at least one fluid spray nozzle and the drainage holes to promote an atomization of fluid through the holes by venturi effect.

16. The multi-cavity oven of claim 1 further comprising
   at least one humidity blocking barrier subdividing the oven cavity into multiple cooking cavities having different humidities wherein each cavity provides a separate heater and a thermal sensor;
   a controller receiving a user command to independently set temperatures of the multiple cooking cavities; and
   a steam generator in each of the multiple cooking cavities and having a water source and a steam heater controlled by the controller to introduce steam into selective cooking cavities for steam cooking;
   wherein the heater and the steam heater of the multiple cooking cavities are independently controlled.

17. The multi-cavity oven of claim 16 wherein the steam generator comprises
   a spinner having a plurality of outwardly extending vanes and a motor controlled by a controller to rotate the spinner about a horizontal axis;
   a water source controlled by the controller to emit a spray of water onto the spinner; and
   a steam heater extending around the spinner to vaporize the water to introduce steam into selective cooking cavities of the oven.

18. The multi-cavity oven of claim 1 further comprising
   at least one humidity blocking barrier subdividing the oven cavity into cooking cavities having different humidities wherein each cavity provides a separate heater and a thermal sensor;

a steam generator system introducing steam into selective cooking cavities according to an electric signal;

a set of fans circulating air independently through the cooking cavities in isolation from the other cooking cavities;

a controller receiving a user command to independently set temperature and humidity of different cooking cavities; and an elastomeric seal positioned between the at least one blocking barrier and the at least one door wherein the elastomeric seal presents an upper cantilevered lip curving to flex upwardly along the inner surface of the at least one door when the door is closed to promote a flow of moisture away from an inner surface of the at least one door and a lower concave surface promoting a sealing of the elastomeric seal against the inner surface.

* * * * *